(12) United States Patent
Webster et al.

(10) Patent No.: US 10,557,460 B2
(45) Date of Patent: Feb. 11, 2020

(54) FLOORING SYSTEM

(71) Applicant: PAVEGEN SYSTEMS LIMITED, London (GB)

(72) Inventors: Craig Webster, Cambridge (GB); Philip Tucker, Brighton (GB)

(73) Assignee: Pavegen Systems Limited, London (GB)

( * ) Notice: Subject to any disclaimer, the term of this patent is extended or adjusted under 35 U.S.C. 154(b) by 2 days.

(21) Appl. No.: 15/759,741

(22) PCT Filed: Sep. 14, 2016

(86) PCT No.: PCT/GB2016/052844
§ 371 (c)(1),
(2) Date: Mar. 13, 2018

(87) PCT Pub. No.: WO2017/046586
PCT Pub. Date: Mar. 23, 2017

(65) Prior Publication Data
US 2019/0048858 A1    Feb. 14, 2019

(30) Foreign Application Priority Data
Sep. 14, 2015 (GB) .................. 1516234.0

(51) Int. Cl.
| | | |
|---|---|---|
| F02B 63/04 | (2006.01) |
| F03G 7/08 | (2006.01) |
| F03G 5/06 | (2006.01) |
| E04F 15/02 | (2006.01) |
| H02K 7/18 | (2006.01) |
| H02N 2/18 | (2006.01) |

(52) U.S. Cl.
CPC .......... *F03G 5/06* (2013.01); *E04F 15/02044* (2013.01); *F03G 7/08* (2013.01); *H02K 7/1853* (2013.01); *H02N 2/18* (2013.01)

(58) Field of Classification Search
CPC ........ F03G 5/06; F03G 7/08; E04F 15/02044; H02N 2/18; H02N 2/183; Y02T 10/641; Y02T 10/7072
USPC ............................... 290/1 R, 1 A, 1 E; 322/3
See application file for complete search history.

(56) References Cited

U.S. PATENT DOCUMENTS

| | | | |
|---|---|---|---|
| 4,295,066 A | * | 10/1981 | Lloyd ................... H01F 7/1615 |
| | | | 310/30 |
| 4,614,875 A | * | 9/1986 | McGee ................ H02K 7/1853 |
| | | | 290/1 C |

(Continued)

FOREIGN PATENT DOCUMENTS

| | | |
|---|---|---|
| CN | 201661047 U | 12/2010 |
| CN | 102439245 A | 5/2012 |

(Continued)

*Primary Examiner* — Tulsidas C Patel
*Assistant Examiner* — Thomas K Quigley
(74) *Attorney, Agent, or Firm* — Jason P. Mueller; Adams and Reese LLP

(57) ABSTRACT

The present invention relates to a flooring system for generating electricity from users as they walk. A flooring system (1) for generating electricity, comprising: a plurality of generators (100), each generator (100) having a support, each generator being arranged to generate electricity from linear motion of the support in a first direction; and a plurality of tiles for supporting one or more people, wherein each support supports a plurality of tiles.

15 Claims, 15 Drawing Sheets

(56) References Cited

U.S. PATENT DOCUMENTS

| | | | | |
|---|---|---|---|---|
| 5,347,186 A | * | 9/1994 | Konotchick | H02K 7/1876 |
| | | | | 310/17 |
| 7,102,244 B2 | * | 9/2006 | Hunter, Jr. | H02K 35/02 |
| | | | | 290/1 R |
| 7,589,428 B2 | * | 9/2009 | Ghassemi | F03G 7/08 |
| | | | | 290/1 A |
| 8,330,283 B2 | * | 12/2012 | Lin | H02K 35/02 |
| | | | | 290/1 R |
| 8,736,088 B2 | * | 5/2014 | Kemball-Cook | H02K 7/1853 |
| | | | | 290/1 R |
| 8,791,584 B2 | * | 7/2014 | Sieger | E01C 5/00 |
| | | | | 290/1 R |
| 9,691,240 B2 | * | 6/2017 | Bradford | E04F 15/02 |
| 10,036,168 B2 | * | 7/2018 | Bordin | E04F 15/02452 |
| 10,270,312 B1 | * | 4/2019 | Kong | H02K 7/06 |
| 2007/0257495 A1 | * | 11/2007 | Kim | F03G 7/08 |
| | | | | 290/1 R |
| 2008/0053018 A1 | * | 3/2008 | Hockemeyer | E04H 1/1205 |
| | | | | 52/263 |
| 2011/0278989 A1 | * | 11/2011 | Sato | E01C 9/00 |
| | | | | 310/339 |
| 2017/0037631 A1 | * | 2/2017 | McManus | E04F 15/02005 |

FOREIGN PATENT DOCUMENTS

| | | | | |
|---|---|---|---|---|
| CN | 104763599 A | | 7/2015 | |
| DE | 102010052048 A1 | * | 5/2012 | E04F 15/02044 |
| DE | 102014107485 A1 | * | 12/2015 | E04F 15/02038 |
| EP | 1127541 | | 8/2001 | |
| EP | 1443159 A2 | * | 8/2004 | E04D 11/005 |
| EP | 2362096 | | 8/2011 | |
| FR | 2971561 A1 | * | 8/2012 | F03G 7/08 |
| FR | 2972773 A3 | * | 9/2012 | F03G 7/08 |
| FR | 2988119 A1 | * | 9/2013 | E04F 15/02183 |
| WO | 2009/041817 | | 4/2009 | |
| WO | 2011/096367 | | 8/2011 | |
| WO | 2011/151402 | | 12/2011 | |
| WO | 2012/033398 | | 3/2012 | |

* cited by examiner

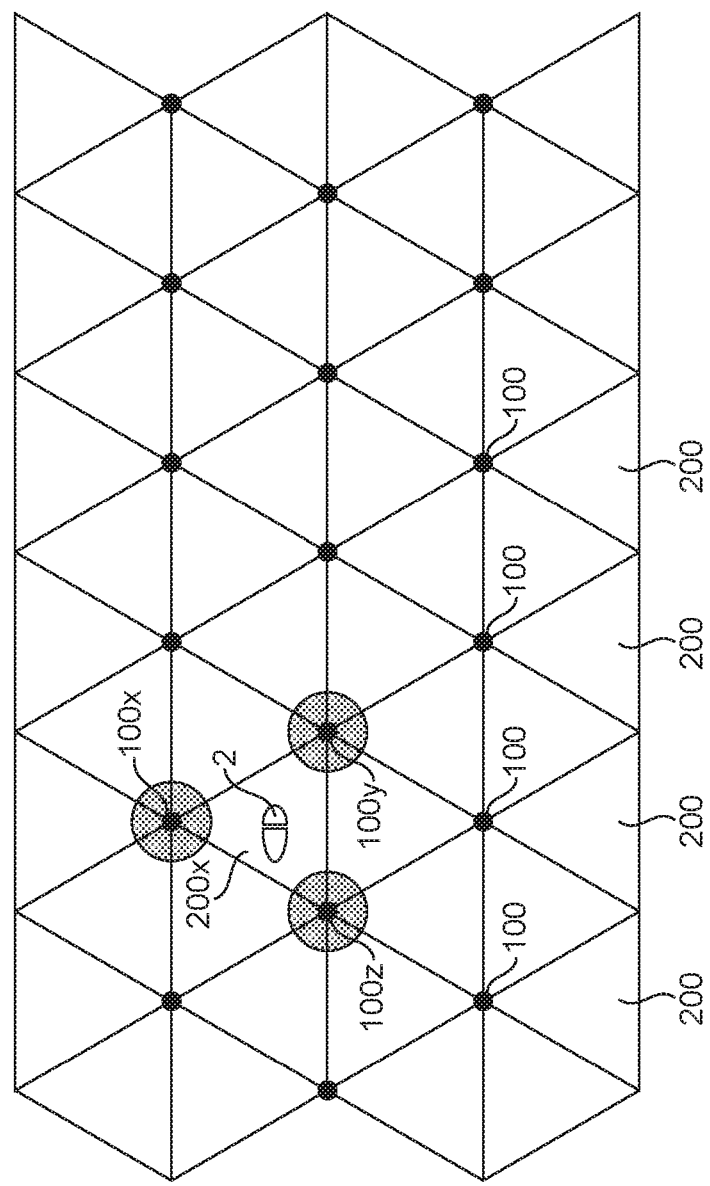

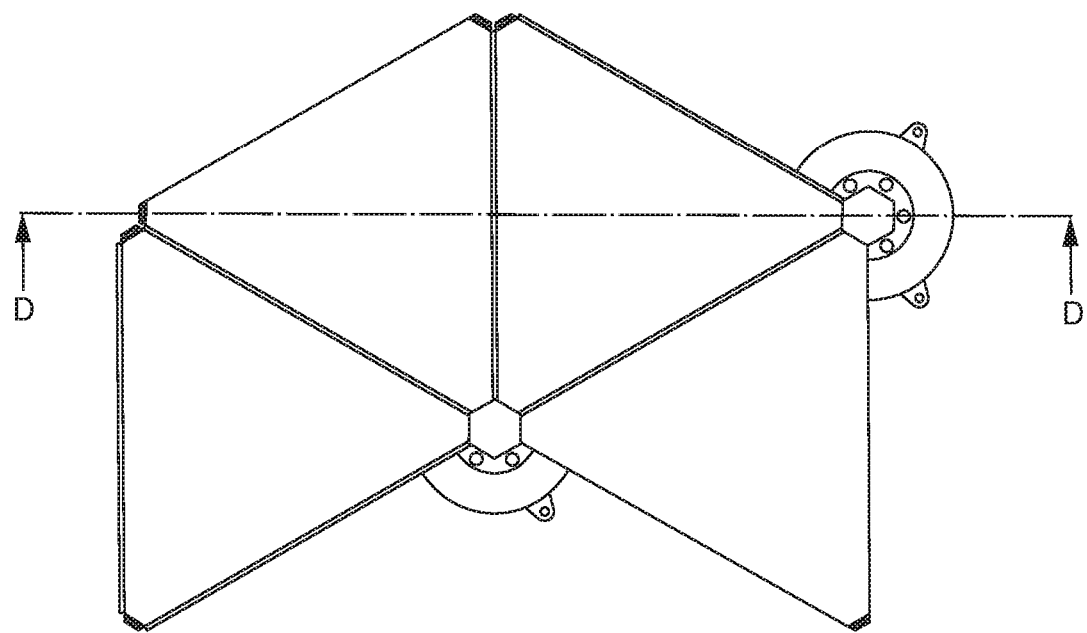
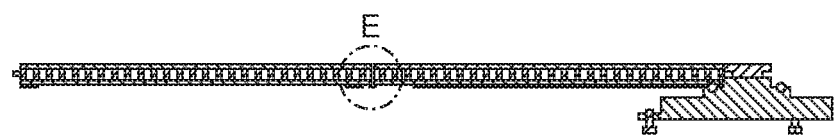
SECTION D-D
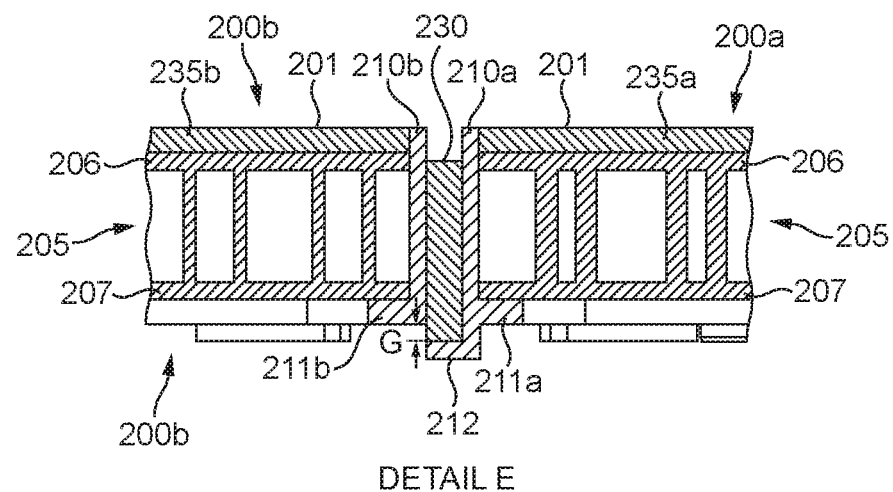
DETAIL E
FIG. 7

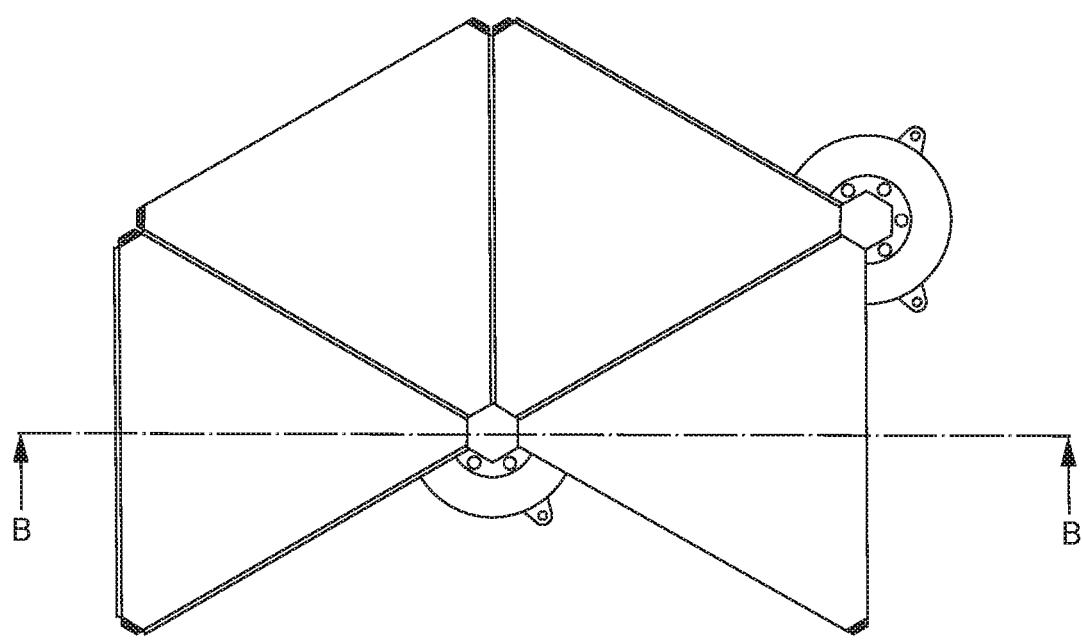
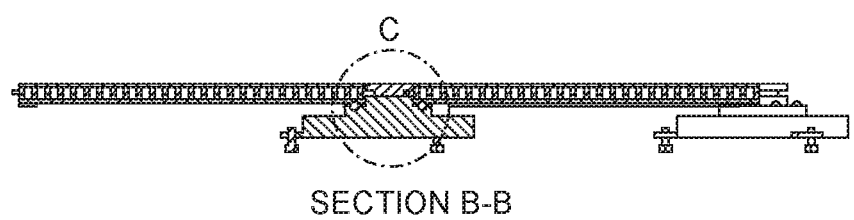
SECTION B-B
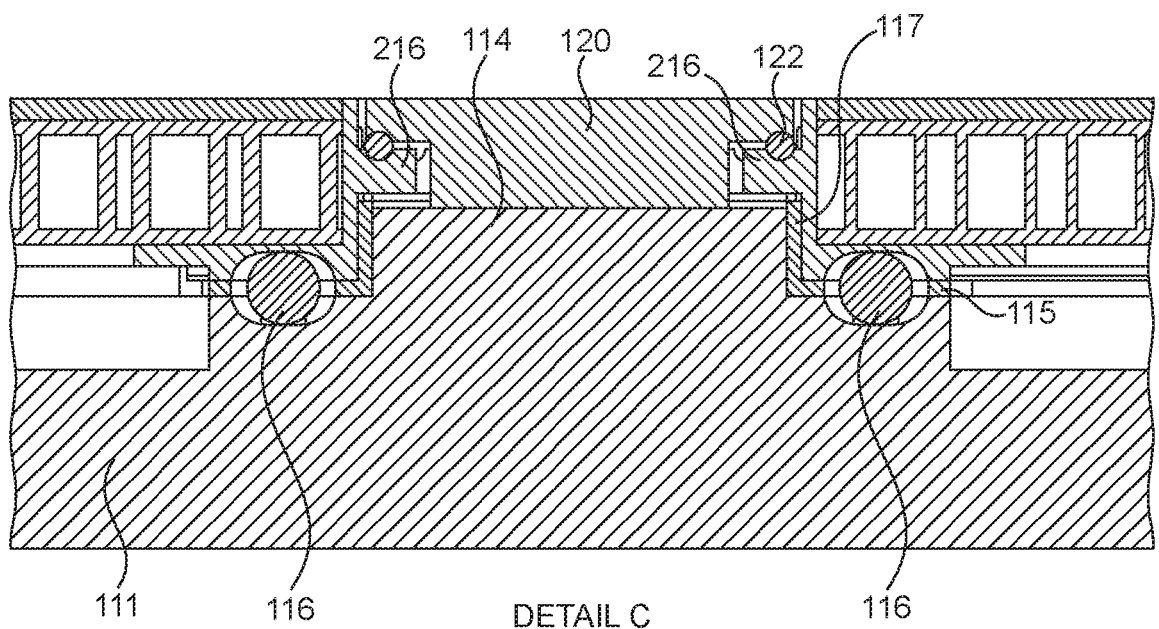
DETAIL C
FIG. 9

FLOORING SYSTEM

The present invention relates to a flooring system for generating electricity from users as they walk.

WO2011138585 and corresponding U.S. Pat. No. 8,736,088, which is expressly incorporated by reference in its entirety herein, discloses a motion converter which converts linear progression caused by traffic-related impulse forces, to be converted to rotational motion for driving the rotor of an electricity generator.

There is a need for a more efficient method of generating electricity from foot traffic.

Furthermore, prior art systems are based on independently movable tiles. When a prior art tile receives a footstep, it will move relative to its neighbours, creating a step, which results in a trip hazard.

According to the present invention there is provided a flooring system for generating electricity, and a method of assembling a flooring system, as defined by the appended claims.

For a better understanding of the invention, and to show how the same may be put into effect, reference is now made, by way of example only, to the accompanying drawings in which:

FIG. 2 shows a schematic representation of a plan view of a flooring system;

FIG. 7 shows a cross-sectional view through two tiles;

FIG. 9 shows a cross-sectional view of a tile meeting a generator;

FIG. 1a shows a first embodiment of a flooring system 1 for supporting one or more people and for generating electricity from the motion of those people as they walk across the flooring system.

Figure 1A:
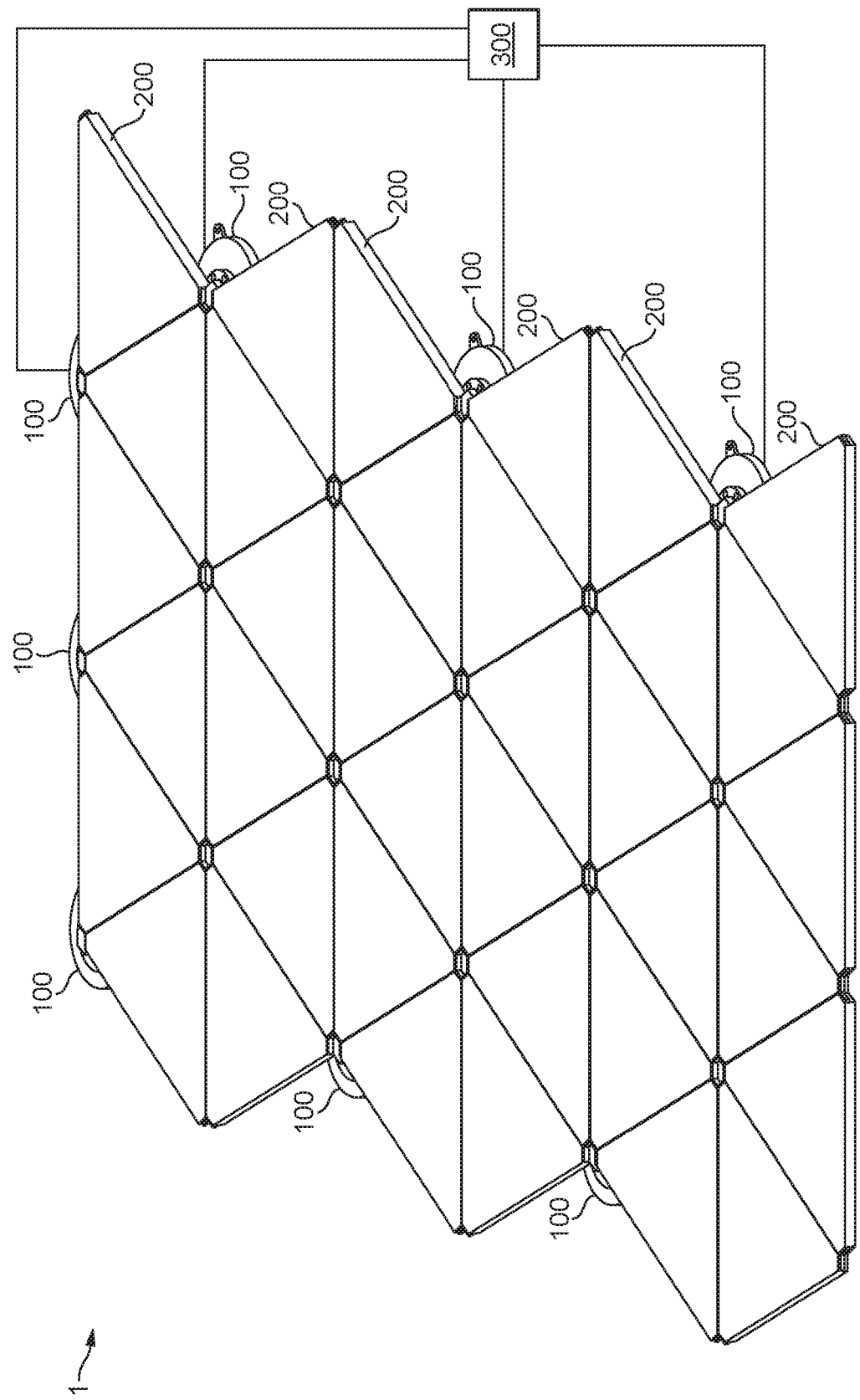
FIG. 1a shows a cut-away perspective view of a part of a flooring system.

The flooring system 1 comprises a plurality of generators 100 and a plurality of tiles 200. The plurality of tiles 200 collectively define a floor surface for walking on.

Each generator 100 comprises a housing 105 and a support 110. The support 110 is movable with respect to the housing 105. Each generator 100 is arranged to generate electricity from linear motion of its support 110 in a first direction. Each support 110 is biased towards a location in the first direction to provide a restoring force following displacement. When the flooring system 1 is installed, the first direction will correspond with the vertical direction, and each support 110 will be biased by an upward force. The preferred form of the generator 100 is described in greater detail below. However, a generator having the form described in WO2011138585, and corresponding U.S. Pat. No. 8,736,088, which is expressly incorporated by reference herein, could be used.

As can be seen from FIGS. 1 and 2, each support 110 supports a plurality of tiles 200. As a user walks across the tiles 200, the support 110 will be displaced from an equilibrium position. This will generate electricity using the generator 100. The support 110 will then be returned to the equilibrium position by the biasing means (not shown). The support 110 will move only over small distance so as to avoid an unpleasant sensation for the user. However, the cumulative effect of many steps from many users over a large area can generate a significant amount of electricity.

The tiles 200 are pivotably support by each support 110. It will be noted that this can prevent trip hazards from arising, since neighbouring tiles will move together.

In the arrangement of FIG. 1a, when a user steps on the flooring system, each footstep 2 will move the support 110 of one (e.g., if the footstep 2 lands on a generator 100), two (e.g., if the footstep 2 lands on the boundary between two neighbouring tiles 200), or three generators 100 (e.g., if the footstep 2 lands in the middle of a tile 200).

The biasing means is preferably a spring, but could be provided by a magnetic device, or a combination of both.

Similarly, each tile 200 is supported by a plurality of supports 110. Thus, a user stepping on a tile 200 can provide motion to each of the corresponding supports 110, and thereby generate electricity via the corresponding plurality of generators 100. In doing so, each tile 200 will displace vertically and/or tilt by a small degree.

Each tile 200 is generally planar with a first major surface 201 and a second major surface 202. The first major surface 201 forms an upper surface in use. The second major surface 202 forms a lower surface in use.

The tiles 200 substantially tessellate to collectively form a substantially continuous floor surface. By "substantially" is meant that the tiles 200 do not meet exactly along each edge, but that a small gap is provided therebetween (to allow for relative rotation of neighbouring tiles 200). Furthermore each tile 200 meets at a generator 100, where a gap is provided between the multiple tiles 200 supported by that generator 100. The gaps along each edge and at each generator 100 are only small in comparison to the surface area of the floor surface taken up by the tiles 200, and so they can be said to substantially tessellate.

Preferably, the major surfaces of each tile is generally shaped as a triangle (most preferably, an equilateral triangle). By "generally shaped" is meant that the tile need not have perfectly sharp corners. As can be seen from FIG. 3, the triangular shape may be slightly truncated in the corners. Since the corners are only truncated by a small amount, they can be said to be generally triangular.

Preferably, each tile 200 is supported by exactly three supports 110. That is, a support 110 may support each corner of a tile 200. The tiles 200 are biased by the biasing means acting on the supports 110 to be flat and level when a user is not standing on the floor surface.

By using this arrangement of tiles 200, the possible degree of tilting of the tiles 200 may be larger than if other arrangements were used. For example, if a user steps on the corner of a square tile 200, the opposite corner could protrude by a corresponding displacement. However, with triangular tiles, the movement of one corner represents the rotation of the tile about one edge, and so undesirable deformations of the floor, such as producing trip hazards, can be avoided for equivalent displacements.

The longest dimension of each tile 200 is no more than 100 cm. Preferably, the longest dimension of each tile is in the range 300 mm to 700 mm.

For a square tile 200, the longest dimension would correspond to the distance between to opposite corners.

In the context of a generally triangular tile 200, the longest dimension is the length of one edge. This substantially corresponds to the distance between supports 110.

For the flooring system 1 to allow sufficient motion, it is preferable that each tile 200 has a thickness T that is as small as possible. This also reduces the need to excavate a large space for installation. However, the tiles must carry the weight of a user and so they must be rigid and strong. Thus, the inventors have designed the preferred composite tiles 200 shown in FIGS. 3*a*, 3*b*, and 3*c*.

Figure 3A:
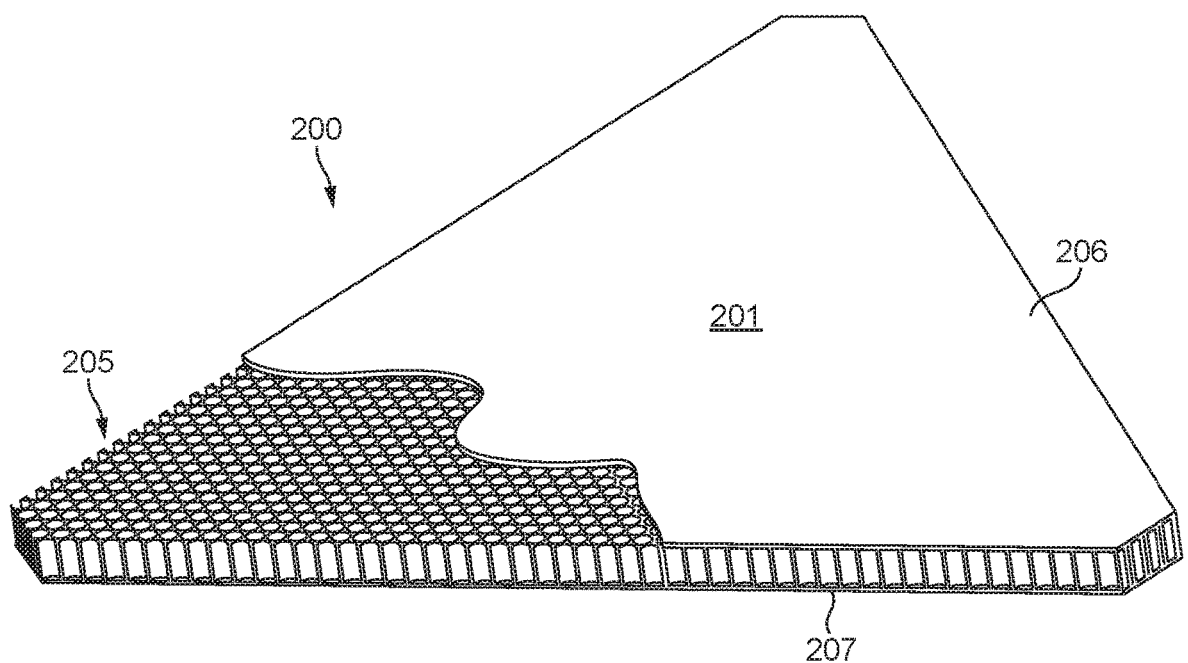
FIG. 3a shows a cut-away perspective view of a tile.
Figure 3B:
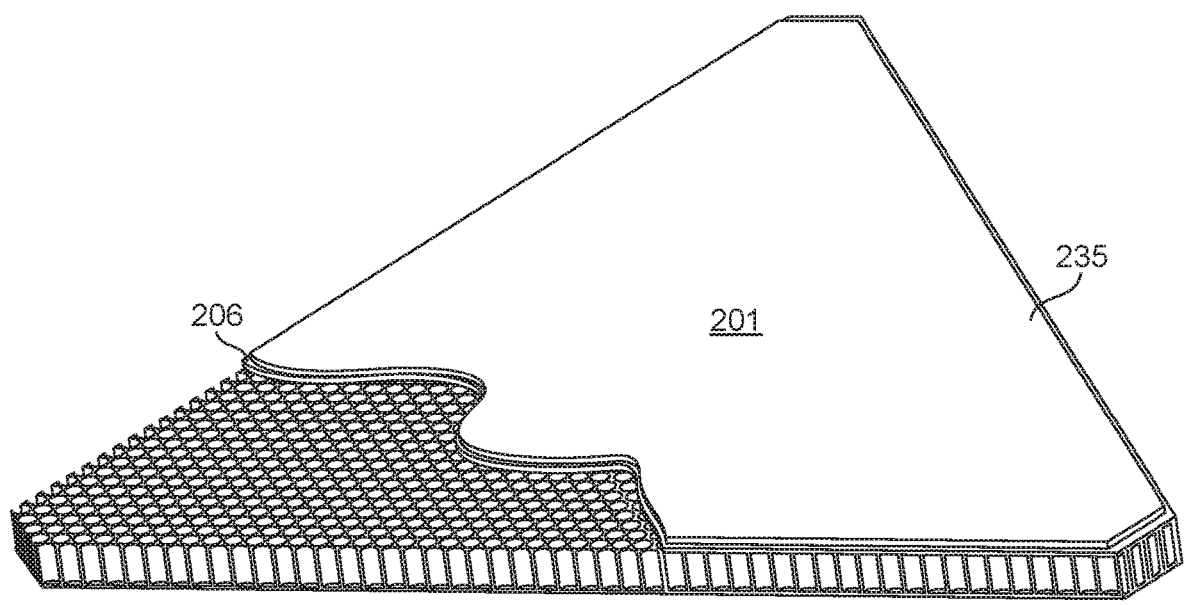
FIG. 3b shows a cut-away perspective view of an alternative tile.

As shown in FIG. 3*a*, preferably, each tile 200 comprises a first sheet 206, and a second sheet 207, and a core 205 sandwiched therebetween.

The core 205 is preferably a non-continuous layer, such as a foam layer or a honeycomb layer. The core 205 may comprise a polymer. Alternatively, the core 205 may comprise particles of wood and a resin. In some embodiments, the core 205 may additionally or instead comprise: Nomex; polypropylene; chipboard; and/or fibre reinforced cement.

One or both of the sheets 206, 207 may comprise a ceramic. Alternatively, one or both of the sheets 206, 207 may comprise a metal. In some embodiments, one or both of the sheets 206, 207 may additionally or instead comprise: steel; and/or laminated ceramic.

For ease of assembly, it is preferable that each tile comprises a platform 205, 206, 207 and a frame 211 that surrounds the perimeter of the major surfaces 201, 202 of the platform.

In more preferred embodiments, the platform may comprise a further layer 235 on top of, or forming part of, the first sheet 206. Layer 235 may be formed of a preferred flooring material. This layer 235 may be decorative and/or resistant to damage from the footsteps of people walking over it.

When the tiles 200 include a frame 211, the supports 110 of the generators 100 preferably support the frames 211 of the tiles 200 directly.

Each frame 211 is formed of frame members comprising an edge member 210 extending along each edge of the major surfaces 201, 202 of the platform 205, 206, 207; 205, 206, 207, 235. Preferably, separate corner pieces 215 are provided, with the edge members 210 meeting at the corner pieces 215.

Figure 3C:
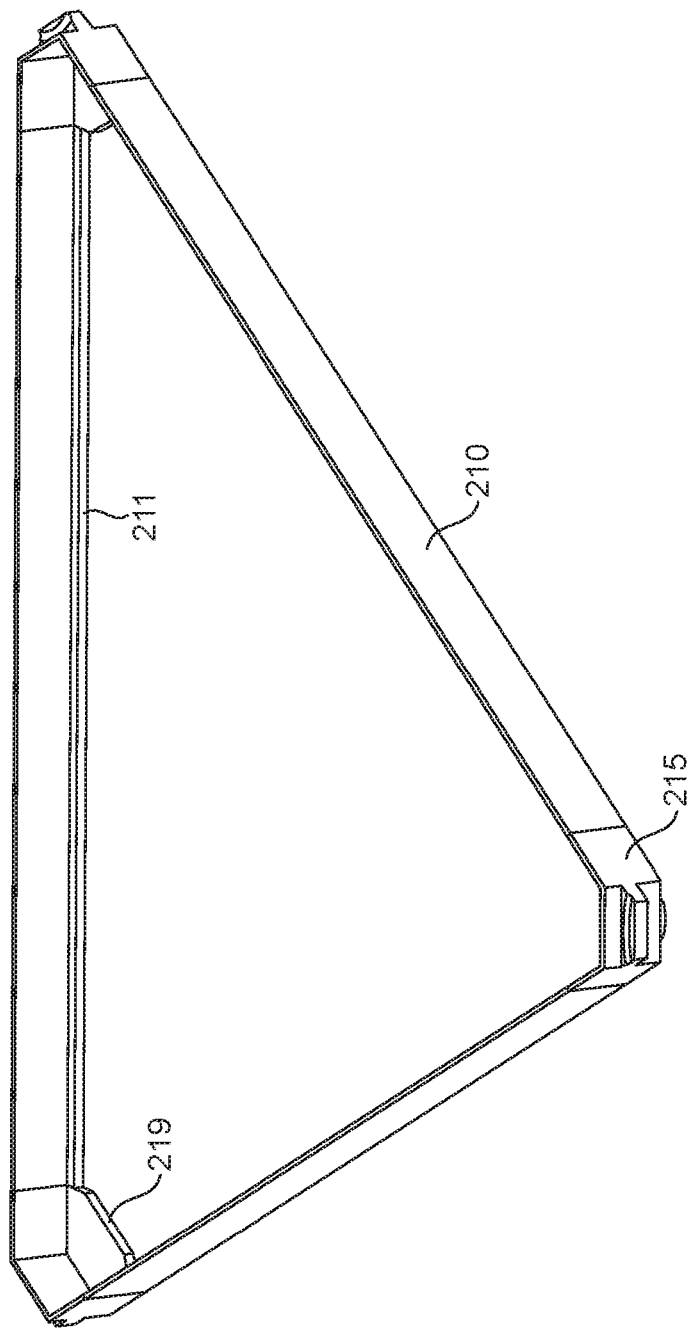
FIG. 3c shows a perspective view of an frame of a tile.

As can be seen in FIG. 3*c*, the frame members are shaped so as to collectively define a seat in which the platform can be seated.

Each edge member 210 may be formed as a strip from which a first lip 211 protruding therefrom (for example, over all or a major portion of its length). If corner pieces 215 are provided, these may be formed as a bent strip from which a web 219 extends to form a seat.

Figure 4:
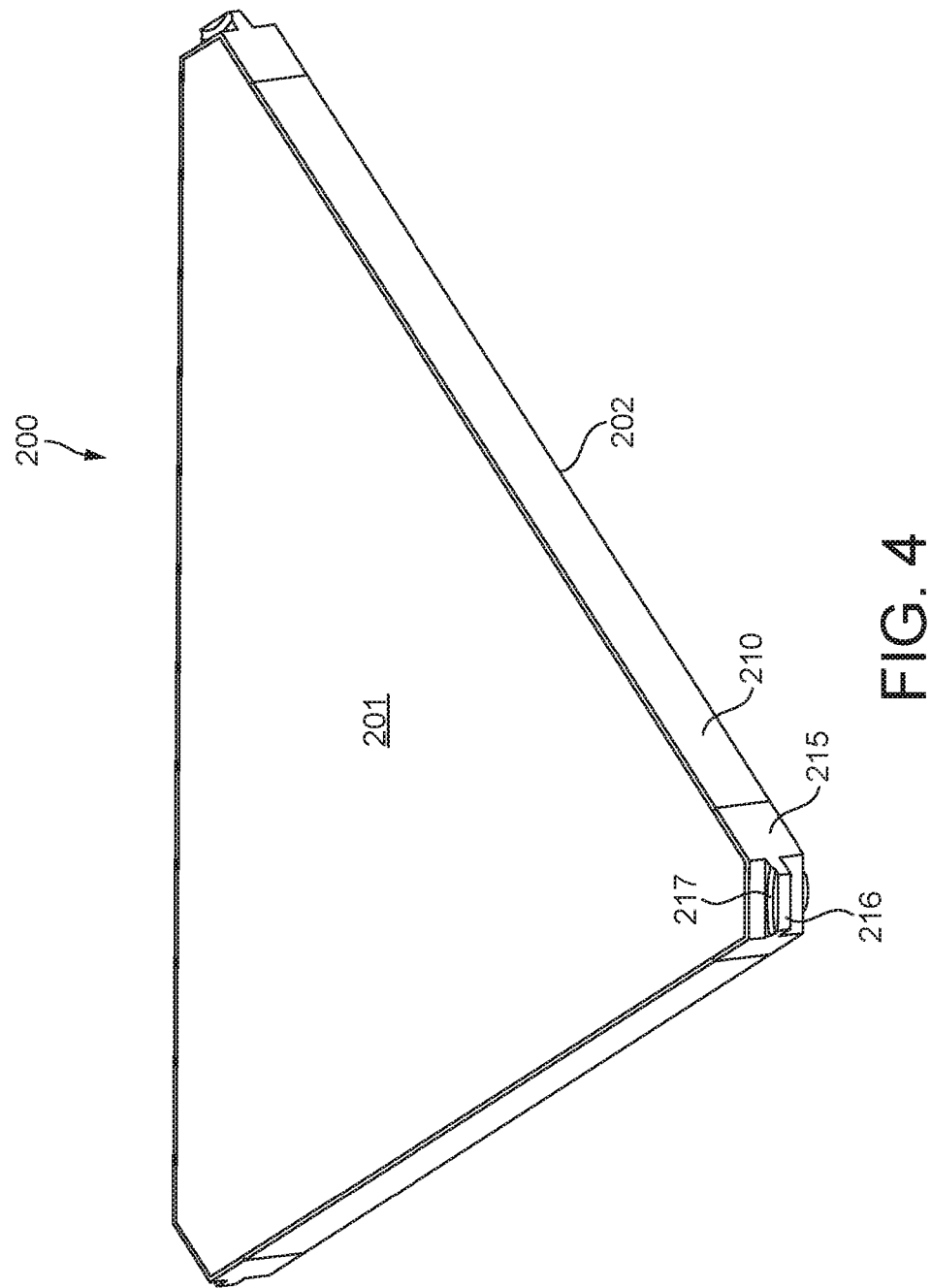
FIG. 4 shows a perspective view of a tile.
Figure 5:
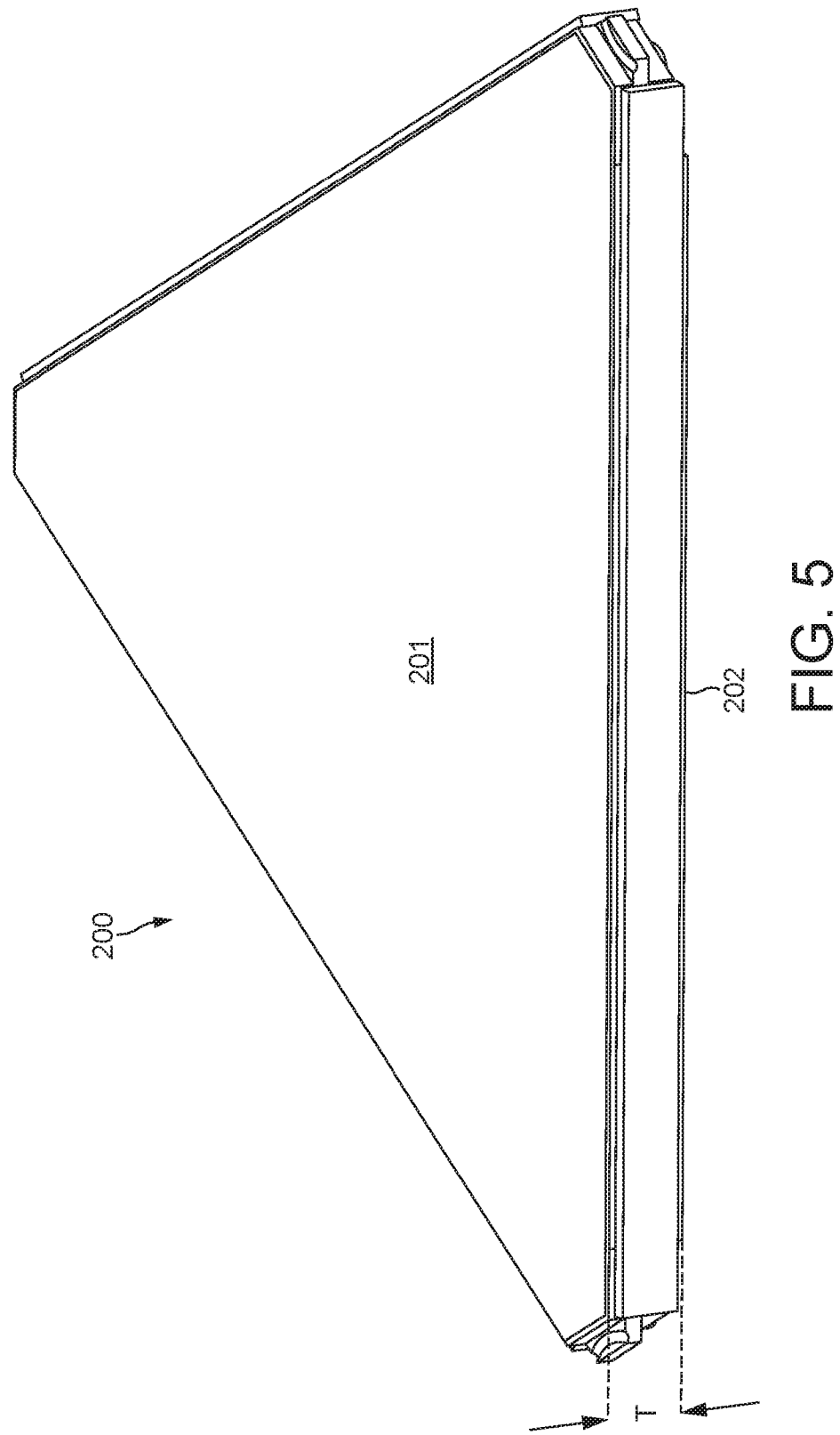
FIG. 5 shows a perspective view of a tile.
Figure 6:
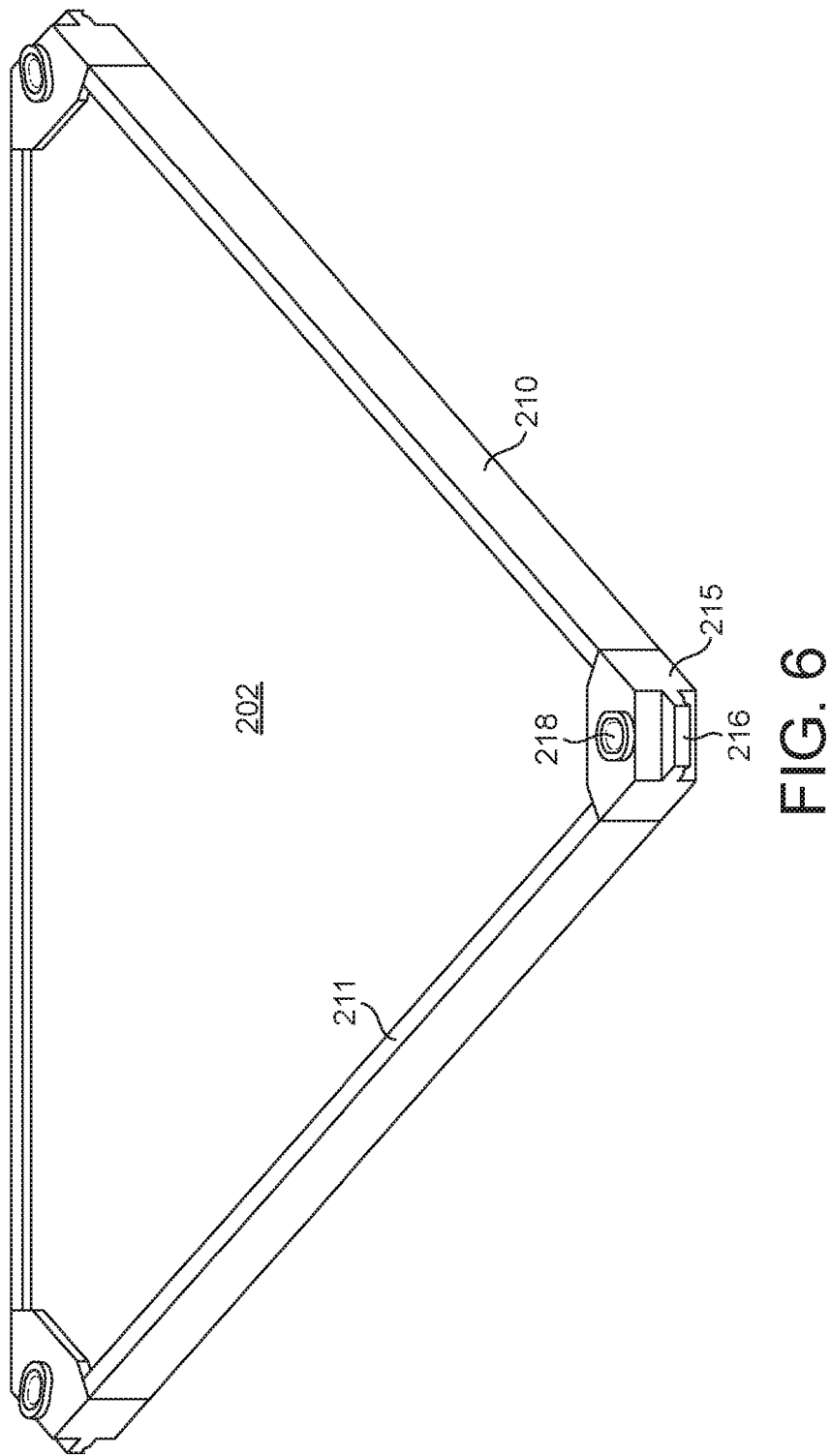
FIG. 6 shows a perspective view of the underside of a tile.

With reference to FIGS. 4 and 6, it can be seen that the corners of the frame 211 are provided with features for pivoting engagement between the tile 200 and the generator 100. In the particular embodiment shown the corners of the frame 211 are provided with features that also allow sliding between the tile 200 and the generator 100. Complementary features may be provided on the generator 100, as discussed below.

The corners of the frame 211 preferably comprise a rib 216 extending therefrom (preferably, parallel to the major surfaces 201, 202 of the tile 200). Optionally, a groove 217 is formed in the rib for reasons discussed below.

The corners of the frame 211 preferably comprise an indent 218 on the underside thereof. The indent 218 is preferably rounded. When seated upon a complementarily-shaped roller (as discussed below), the indent 218 can allow rotation of the tile 200 in multiple degrees of freedom. In fact, the indent 218 is also elongated to allow sliding motion.

Figure 3D:
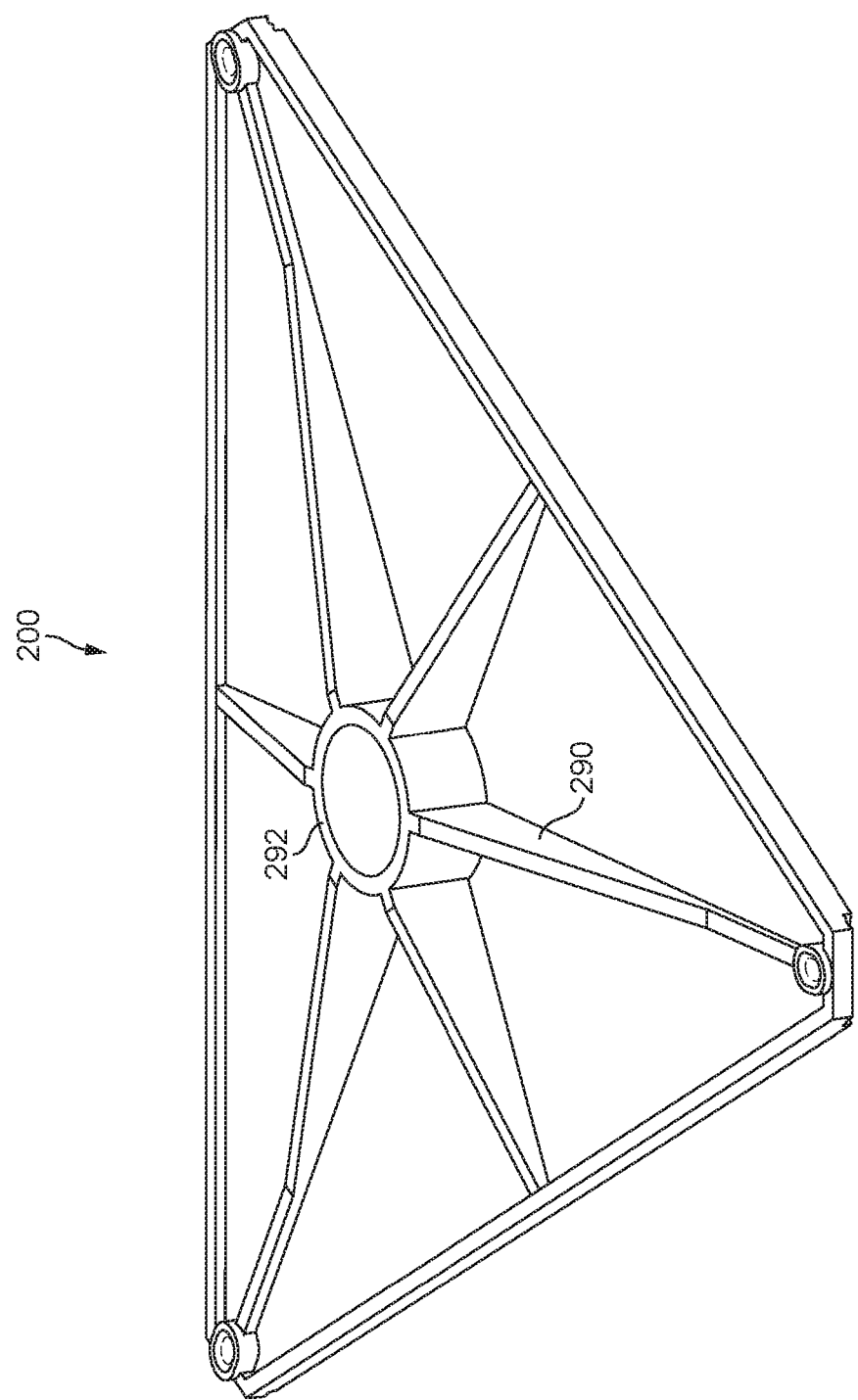
FIG. 3d shows a perspective view of the underside of a tile.

As can be seen in FIG. 3*d*, the tile 200 may be provided with reinforcing ribs 290 to provide extra rigidity. Preferably, a central stop 292 is also provided. The central stop 292 is arranged to contact with the ground if too great a force is applied to the tile 200. In this way, the generator 100 may be protected. The ribs 290 and stop 292 may be formed as part of the frame 211 or the platform.

Preferably, a flexible sealing strip 230 is provided between the neighbouring edges of each adjacent tile 200. This can prevent the ingress of most solid materials (and, in some cases, liquids) into the area below the floor. Furthermore, and equally importantly, the sealing strip 230 acts to prevent a direct impact between adjacent tiles 200. The tiles 200 are rigid and so contact would produce noise as a user walks across the flooring system 1.

With reference to FIG. 7, there can be seen a cross-sectional view of two tiles 200*a*, 200*b* along and edge thereof. In this example, the platform preferably comprises a first sheet 206, a second sheet 207, a core 205, and a further layer 235 of flooring material. A flexible sealing strip 230 extends between the two tiles 200.

For the first tile 200*a*, the strip of the frame member 210*a* extends from the first major surface 201 such that it is flush with the surface of the flooring material layer 235. Thus, the frame can protect the layer 235. The lip 211*a* provides a support for the platform. The strip of the frame member 210*a* extends below the level of the lip 211*a*. Extending outwardly from the strip in the opposite direction from lip 211*a*, and positioned further from the major surface 202 of the tile, is a supporting flange 212. The supporting flange 212 may extend over all or a major portion of the length of the strip.

It is possible for all frames to include a supporting flange 212. However, it is preferred that each sealing strip 230 is supported by only a single supporting flange 212. The simplest way to achieve this is by including two types of tile 200*a*, 200*b*. The first type of tile 200*a* includes a supporting flange 212 along every edge, while the second type of tile 200*b* does not include a supporting flange 212. The two types of tile 200*a*, 200*b* can then be arranged such that for a given tile 200 every adjacent tile 200 is of a different type.

In this example, for the second tile 200*b*, the strip forming the frame member 210*b* also extends from the first major surface 201 such that it is flush with the surface of the flooring material layer 235. However, the strip for this tile 200*b* extends only as far as lip 211*b* on which the platform is seated. The supporting flange 212 of the strip of the first tile 200*a* extends below the strip of the second tile 200*b* by a distance G.

Every other tile may have edge members 210 formed with a second lip 211 protruding from the strip (for example, over all or a major portion of its length).

The supporting flanges are used to support the flexible sealing strips 230. The flexible sealing strip 230 is formed of a compressible material to not hinder the relative movement of the neighbouring tiles 200. The strip 230 may comprise or be formed of: rubber; neoprene; TPV; TPE; and/or polymeric materials.

An array of generators 100 is provided. The generators 100 are preferably provided in a regular array so as to support the corners of the tiles 200. Other arrangements can be used (for example, the generators could be provided at the midpoints of the edges of the tiles), but the disclosed arrangement is preferable.

The corners of multiple tiles 200 tiles sit on a single support 110. In the preferred embodiment six tiles 200 sit on each support 110.

Figure 8:
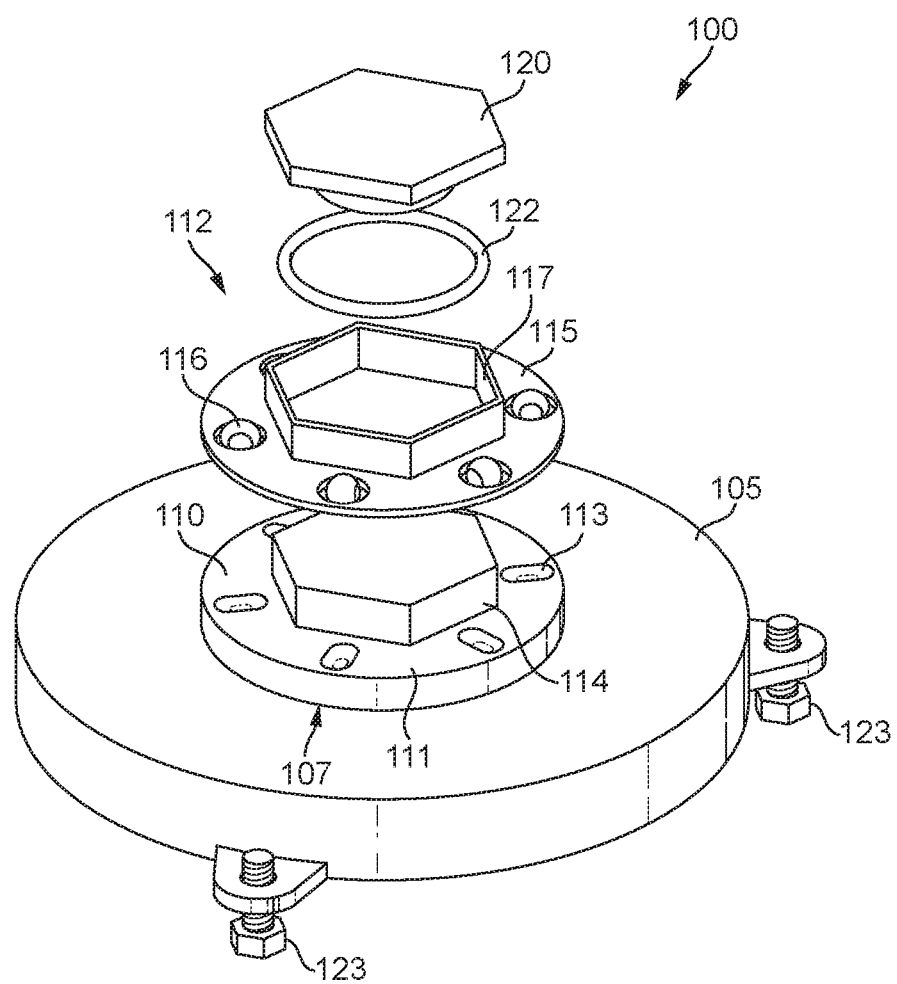
FIG. 8 shows an exploded perspective view of part of a generator.

As can be seen in FIG. 8, each generator 100 comprises an housing 105, having an aperture 107 through which part of the support 110 extends. The generator 100 may comprise two or more adjustable feet 123 extending from the housing 105 to enable its height and orientation to be adjusted.

The generator 100 may be an electromagnetic generator comprising a rotor (not shown) that rotates about an axis parallel with the first direction. The rotor may be driven to rotate by motion of the support 110 in the first direction. Suitable arrangements of magnets and coils may be provided (not shown) to generate electricity from the rotation of the rotor. WO2011138585, and corresponding U.S. Pat. No. 8,736,088, which is expressly incorporated by reference herein, discloses an optional form of generator.

It has been found through significant efforts that in order to provide the user with a suitable experience, the range of movement of each support 110 in the first direction should be limited to by no more than 20 mm. Preferably, the range of movement should be in the range 5 mm to 10 mm.

Each generator 100 may comprise a biasing means such as one or more spring(s) for biasing the support 110 in the first direction to a nominal position. Alternatively, or in addition, the biasing means may be provided separately from each generator 100. If the biasing means act directly on the tiles 200 to level the tiles 200 when the floor surface is not carrying the weight of a user, then they will necessarily bias the supports 110 back to the nominal positions.

Each support 110 comprises a plurality of pivots via which each tile 200 is supported, wherein each pivot allows one tile 200 to tilt relative to the support 100, and preferably also to slide relative to the support 100.

Preferably, each support 110 comprises a platform 111 upon which is located a gasket 112. The gasket 112 is preferably made of resilient material to muffle the sound of footsteps. Preferably, the gasket 112 comprises or is formed of: rubber; neoprene; TPV; TPE; and/or a polymeric material.

The tiles 200 are supported on the gasket 112.

In preferred embodiments, the gasket 112 comprises a plurality of rollers 116. The rollers 116 may be seated in complementarily-shaped indents 113 in the platform 111. Rollers may be any suitable shape, e.g. cylindrical, but are preferably spherical or generally spherical. The rollers 116 are complementary to the indents 218 in the tiles 200 described above. The rollers 116 and indents 113, 218 can allow rotation of the tile 200 in multiple degrees of freedom.

Preferably, one roller 116 is provided per tile 200. (That is, in the preferred embodiment, six would be provided on each support 110).

As shown in the preferred embodiment of FIGS. 8 and 9, the support 110 may comprise a neck 114 extending from the platform 111. The gasket 112 may comprise a sleeve 117 with a flange 115 extending from the base thereof. The sleeve 117 fits around the neck 114 of the support 110 with the flange 115 resting on the surface of the platform 111. The rollers 116 are formed in the flange.

Each roller 116 may be a separate article rotating about a shaft of the flange 115. However, since the amount of movement of the roller 116 need not be great, it may be manufactured integrally with the flange gasket 112. For example, the roller 116 may be linked to the flange 115 of the gasket 112 via a resilient web (e.g., a narrow web of the gasket 112 material) that twists and/or stretches as the roller 116 rotates.

In order to restrain vertical motion of each tile 200 and to ensure that the edges of every tile 200 are aligned, a cap 120 may be provided. The cap 120 may prevent the tile 200 from translating relative to the support 110 in the first direction. The cap 120 may be fixed to the support 110 (for example, the neck 114 of the support 110) by any fixing means (e.g., by screws). In order to prevent the hard tile from contacting the hard cap 120, an O-ring 122 and/or further gasket made from resilient materials may be provided therebetween.

Preferably, the O-ring 122 or further gasket comprises or is formed of: rubber; neoprene; TPV; TPE; and/or a polymeric material.

FIG. 9 shows a cross-section through the corners of two tiles 200 at a generator 100 through two rollers 116. As can be seen, the rigid tiles 200 do not contact the rigid components of the support 110 or cap 120 directly, but are supported by the resilient materials of the gasket 112 and O-ring 122.

In this preferable arrangement, rib 216 extending from the corners of the frame 211 engages the underside of the cap 120 via the O-ring 122 or gasket, while the underside of the frame 211 sits on the gasket 112. When an O-ring 122 is provided, the groove 217 formed in the rib 216 corresponds to the shape of the O-ring 122.

In assembling the flooring system 1, the frames 211 and generators 100 can be installed first. Then the height and level of the generators 100 may be adjusted until the frames 211 are all level. The platforms of the tiles 200 may then be placed into the frames 211. The height and level of the generators 100 may be adjusted using the feet 123. The seals 230 may then be inserted between neighbouring tiles.

Figure 1B:
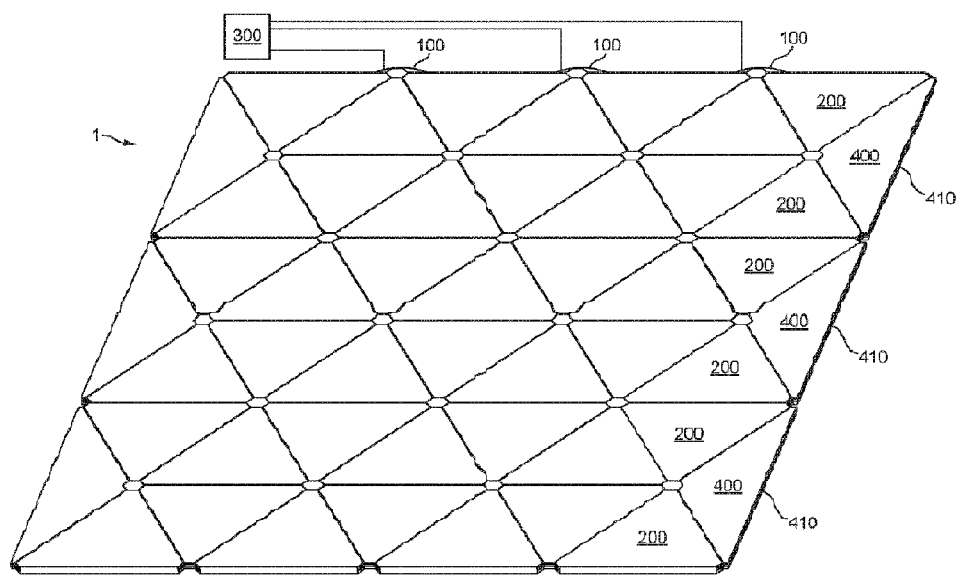
FIG. 1b shows a perspective view of a part of a flooring system.

As can be seen from FIG. 1*b*, at the boundary of the flooring system additional tiles 400 of a different shape may be provided. These may be pivotably attached 410 to other flooring to provide a smooth transition between the system of the invention and conventional flooring.

The inventors have realised that the flooring system 1 can be used, in addition to generating electricity, to collect data about the presence and/or movement of people across the flooring system 1.

The flooring system 1 may comprise a data processing system 300 in communication with each generator for receiving the electrical power generated thereby.

Firstly, it has been found that an appropriately accurate estimate of person occupancy of an area of the flooring system 1 can be determined based on the power output of the floor as a whole.

For a given selection of generators, their arrangement, and the arrangement of tiles, an average power output per user can be determined. For example, under controlled conditions a number of people can be instructed to walk across the floor, and the power output measured. The measured power can be averaged over time and divided by the number of people to provide the average power output per person. This predetermined value can be stored by the system 1.

Thus, in order to monitor the occupancy of an area, the data processing system 300 is arranged to estimate the number of people supported by the plurality of tiles by: calculating a total power output of the plurality of generators; and dividing the total output by the stored predetermined value.

The occurrence of a footstep 2 on a tile 200 can be noted by the data processing system 300. The identification of a tile 200 as it is contacted by a footstep 2 may be stored by the data processing system 300. Thus, the data processing system 300 may record the time and location (the particular tile 200) of each footstep 2.

With reference to FIG. 2, the inventors have also realised that the support of a tile 200$x$ using three or more generators 100$x$, 100$y$, 100$z$ allows information to be gathered about the location of a footstep 2 on a particular tile 200 the flooring system 1.

During a footstep, the electrical signal generated by each of the three generators 100$x$, 100$y$, 100$z$ can be compared. For example, the voltage generated by the generators 100 can be recorded. If the footstep is closer to one generator 100 than another, then that generator will generate a greater voltage. By comparing the voltages provided by the generators 100$x$, 100$y$, 100$z$ supporting a tile 200$x$ it is possible to identify the relative distance between the generators 100, and thereby determine the location of the footstep 2 (i.e., the centre of gravity of the footstep 2) on each tile 200.

Moreover, with the preferred form of generator 100 described above, an electromagnetic generator comprising a rotor that rotates about an axis, it is possible to provide a signal representing the speed of rotation (or rotational frequency) of the rotor. This can also provide an indication of a footstep 2. In any of the above cases, the generator 100 can be configured to generate a signal representing a force applied to the generator 100 by the tile 200.

Figure 10:
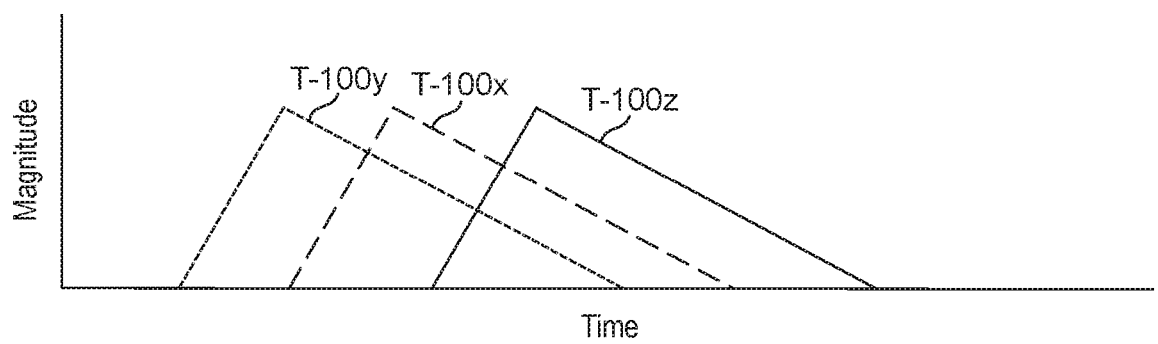
FIG. 10 shows a schematic representation of a time series generated by a flooring system.

During a footstep, the signal generated by each of the three generators 100$x$, 100$y$, 100$z$ will reach a maximum at a different time. A rough representation of a time series of three signals T-100$x$, T-100$y$, T-100$z$ is shown in FIG. 10. For example, in a typical footstep, as a user's foot contacts a tile 200, the foot will firstly impact on the heel and then roll towards the ball of the foot. For each of the three generators 100$x$, 100$y$, 100$z$ the centre of gravity of the footstep 2 will move towards or away from the generator 100$x$, 100$y$, 100$z$ resulting in the maximum values of the signals T-100$x$, T-100$y$, T-100$z$ being achieved at different times.

The data processing system 300 is arranged to determine a time difference between the signals received from the generators 100 supporting that tile 200 to estimate the direction of the user's motion.

Preferably, the data processing system 300 is arranged to determine the order in which the signals received from the generators 100 supporting that tile 200 reach a maximum value. The order in which the generators 100$x$, 100$y$, 100$z$ reach the maximum value is indicative of the direction of the footstep 2.

It can be therefore seen from the description above that the flooring system 1 can provide an estimate of location of a footstep (either coarsely, identifying a particular tile, or more accurately, identifying the location on that tile) and its direction.

Moreover, based on the magnitude of the footstep 2 (e.g., the energy generated by a single step), the size of a user may be estimated. This can be configured by instructing users of known mass to walk across the flooring system 1 and carrying out appropriate measurements.

For a more accurate estimate of the size of a user, the user's speed may be taken into account. A user running can generate more energy than a user walking slowly. Speed may be derived from the output of a tracking algorithm (discussed below), the duration of the footstep 2, and/or the time series data for each footstep 2 (which characterises the variation in footstep force over time). Again, this can be configured by instructing users of known mass to walk across the flooring system 1 at a known pace and carrying out appropriate measurements.

The occurrence of a footstep 2 on a tile 200 can be noted by the data processing system 300, which may apply a tracking algorithm to track the passage of a walker across the flooring system 1. For example, the arrangement of the tiles 200 may be stored in the data processing system 300. The identification of a tile 200 as it is contacted by a footstep 2 may be provided as an input to a tracking algorithm, which may be configured to track the path of the user walking across the flooring system 1. That is, the data processing system 300 may record the time and location of each footstep 2, and will label each footstep 2 as corresponding to the same user as another footstep 2. Suitable tracking algorithms are well known in the art, and include, for example: Kalman filters; and/or probability hypothesis density tracker.

The identification of a tile 200 as it is contacted by a footstep 2 may be supplemented with time series data representing the time series output of each generator 100 corresponding to the tile 200 to provide as an input to a tracking algorithm.

However, the inventors have found that the additional data "pre-processing" steps set out above can be used in a tracking algorithm at lower computational expense.

It is also preferable to time stamp the data provided to the tracker.

Preferably, the input to the tracking algorithm is the location of a footstep 2 and the direction of the footstep 2.

More preferably, the input to the tracking algorithm is one or more of: the location of a footstep 2, the direction of the footstep 2, the magnitude (power or energy) of the footstep, and data representing an estimate of the mass of the user.

Preferably, the generators 100 provide an output signal representing the force applied periodically, after a time period of from 10 ms to 50 ms.

In some embodiments, the output signal may be triggered by a footstep and last for between 250 ms and 750 ms, preferably 500 ms.

The data processing system 300 can therefore output an estimate of one or more of:
  occupancy of a selected area;
  the raw track representing the path of one or more users across the flooring system 1;
  the average walking speed of the group of users (this can be derived by dividing path length by time); and/or
  the average number of people in a given period of time passing through a predetermined location.

As will be appreciated by one skilled in the art, whilst it is preferable to use generators to harvest energy from the flooring system 1, the advantages of the tracking methodology would be available if the generators were simply replaced with some form of pressure sensor, such as a piezo-electric sensor. Indeed, in this context, the generator can be thought of as a sensor.

In a further alternative embodiment, the flooring system 1 may additionally comprise a plurality of electromagnetic receivers for receiving identifiers transmitted by mobile communications devices and for identifying the strength of reception of each of the identifiers. Preferably, each receiver is located in the space below the corresponding tile 200.

Preferably, the receivers are arranged to receive identifiers transmitted by mobile phones (cell phones). For example, the receivers are arranged to receive RFID, Bluetooth or Zigbee signals identifying a mobile phones.

In response to a force applied to a tile 200, the sensors are arranged to activate the receiver corresponding to that tile 200.

The receiver can receive multiple transmitted identifiers measure the strength of reception corresponding to each transmission. The system assumes that the greatest strength of reception can correspond to the mobile communications device carried by the user that stepped on the tile 200.

Thus, when activated, the receiver is arranged to receive any transmitted identifiers and to determine the identifier corresponding to the reception of greatest strength.

The data processing system 300 is in communication with each sensor and each receiver, and is arranged to generate data representing the time at which the force was sensed, the tile 200 to which the force was applied, and the determined identifier received by the receiver corresponding to that tile 200. One or each of these data can be used to supplement the input to the tracker.

It is noted that if a user is not carrying a mobile communications device, then the received identifier would be incorrect. However, using an appropriate tracking algorithm (e.g., a probabilistic tracker such as a Kalman Filter), this error can be easily disregarded. On the other hand, when the received identifier is correct, this provides a great improvement in the performance of the tracking algorithm.

In a similar embodiment, the flooring system 1 does not receive from the user. Instead each tile has associated therewith a transmitter that transmits a signal (for example, a code denoting its own identity).

Such a flooring system 1 comprises: a central receiver for receiving identifiers transmitted by mobile communications devices; a plurality of tiles for supporting one or more people, each tile coupled to one or more sensors for sensing a force applied to the tile; and a plurality of electromagnetic transmitters for transmitting a signal for illiciting a response from a mobile communications device, each transmitter corresponding to a respective tile, wherein: in response to a force applied to a tile the sensors are arranged to activate the transmitter corresponding to that tile, wherein: the flooring system further comprising a data processing system, in communication with each sensor and the receiver; and the data processing system is arranged to generate output data representing the time at which the force was sensed, the tile to which the force was applied, and the determined identifier received by the receiver.

Preferably, the transmitter is located below the corresponding tile and the electromagnetic receiver is arranged to receive identifiers transmitted by mobile telephones. The mobile telephone may have thereon software (e.g., an app), programmed to respond to the receipt of the transmission by sending an identifying code to the central receiver.

Figure 11:
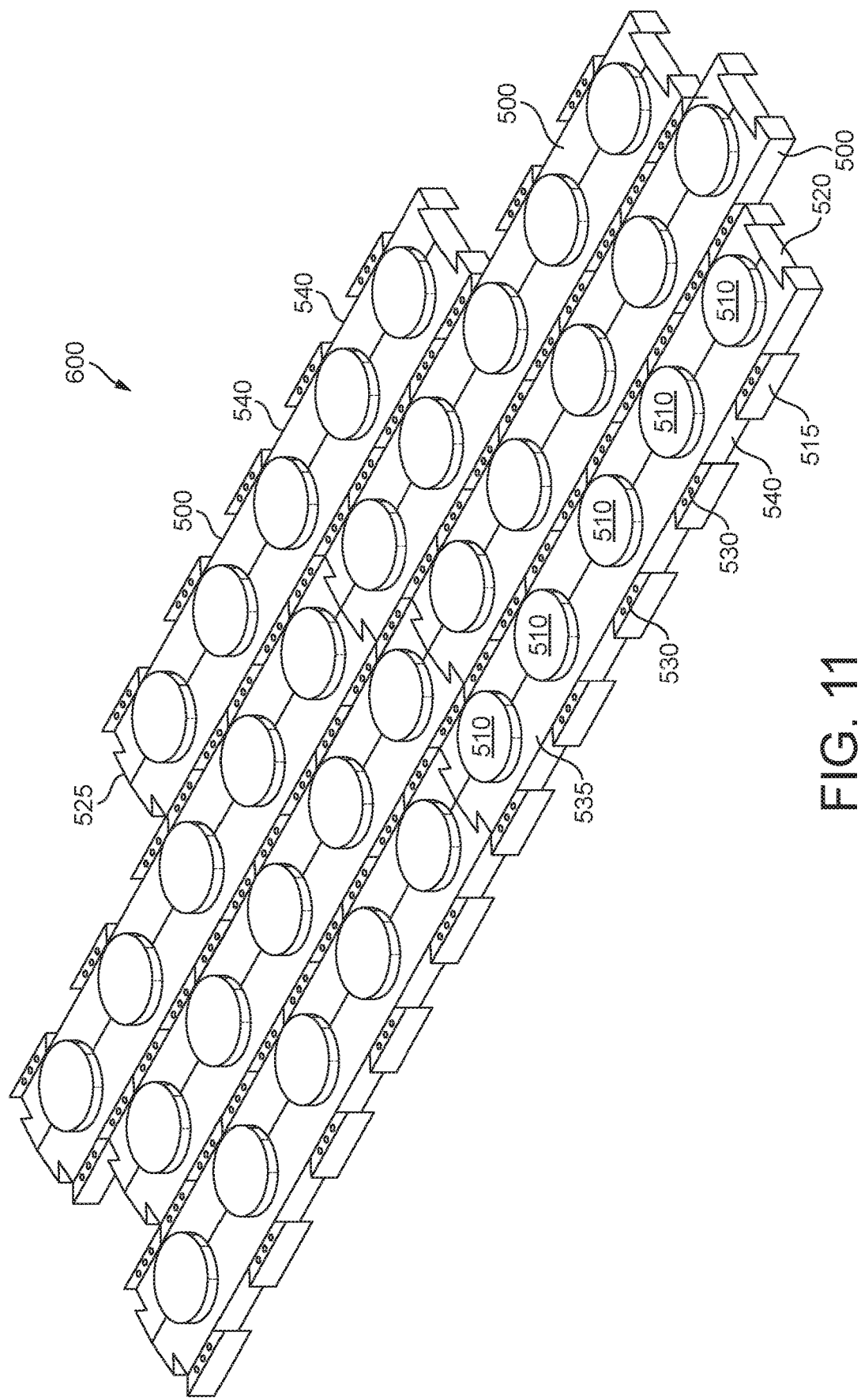
FIG. 11 shows a component of the flooring system.

FIG. 11 shows a base 600 upon which the flooring system 1 can be installed. The base 600 comprises a plurality of slabs 500 (preferably formed of or comprising concrete).

Each slab 500 includes a raised pedestal 510 on which a generator 100 of the flooring system 1 may be placed. Drainage holes 535 are also provided to provide a path for the egress of liquid on the base 600. Any liquid spilled upon the flooring system 1 that passes the sealing strips, O-rings, and/or gaskets, will thus not pool around a generator 100. Moreover, the slabs 500 may be provided with an inclined upper surface, sloping away from the pedestals 510 and towards the drainage holes 535, so that gravity draws the liquid away from the pedestals 510.

The slabs 500 may include interlocking features 515, 520, 525 to enable each slab 500 to interlock with another slab 500.

Preferably, each slab 500 comprises a plurality of tabs 515 and a plurality of complementarily-shaped cavities 540 spaced along two or more edges. The tabs 515 preferably have a trapezium shape such that the cavities 540 are defined therebetween.

Preferably, one or more drainage holes 535 are provided in one, more or all of the tabs 515.

Preferably, each slab comprises a plurality of pedestals 510 spaced in a line that terminates at one end in a tab 520 and another end in a complementarily-shaped cavity 525.

The invention claimed is:

1. A flooring system for generating electricity, comprising:
   a plurality of generators, each generator having a support, each generator being arranged to generate electricity from linear motion of the support in a first direction; and
   a plurality of tiles for supporting one or more people, wherein:
   each support supports a plurality of tiles; and
   the majority surfaces of each tile are generally shaped as a triangle.

2. The flooring system of claim 1, wherein each tile is supported by a plurality of supports.

3. The flooring system of claim 1, wherein each tile is pivotably and/or slidably supported by each support.

4. The flooring system of claim 1, wherein each tile is supported by exactly three supports.

5. The flooring system of claim 1, wherein the tiles substantially tessellate to collectively form a substantially continuous surface.

6. The flooring system of claim 1, wherein the major surfaces of each tile is generally shaped as an equilateral triangle.

7. The flooring system of claim 1, wherein the longest dimension of each tile no more than 100 cm.

8. The flooring system of claim 1, wherein the longest dimension of each tile is in the range 30 cm to 70 cm.

9. The flooring system of claim 1, wherein each of the plurality of generators is an electromagnetic generator comprising a rotor that rotates about an axis parallel with the first direction.

10. The flooring system of claim 1, wherein the support of each of the plurality of generators is movable in the first direction by no more than 20 mm.

11. The flooring system of claim 1, wherein the support of each of the plurality of generators is movable in the first direction by an amount in the range 5 mm to 10 mm.

12. The flooring system of claim 1, wherein each support comprises a plurality of pivots via which the tiles are supported, wherein the pivots allow the tiles to tilt relative to the support.

13. The flooring system of claim 1, wherein each support comprises a cap for restraining vertical motion of a tile relative to the support.

14. The flooring system of claim 1, further comprising a plurality of flexible sealing strips, each flexible sealing strips extending along the neighbouring edges of two adjacent tiles.

15. The flooring system of claim 14, wherein the flexible sealing strips are formed form or comprise rubber; neoprene; TPV; TPE; and/or other polymeric materials.

* * * * *